Feb. 12, 1935.  E. P. KINNE  1,990,700
TRACTOR TRAILER DEVICE
Filed Oct. 10, 1932   3 Sheets-Sheet 1

Inventor:-
Edmund P. Kinne,
By: Wilkinson, Huxley, Byron & Knight
Attys.

Feb. 12, 1935. E. P. KINNE 1,990,700
TRACTOR TRAILER DEVICE
Filed Oct. 10, 1932 3 Sheets-Sheet 2
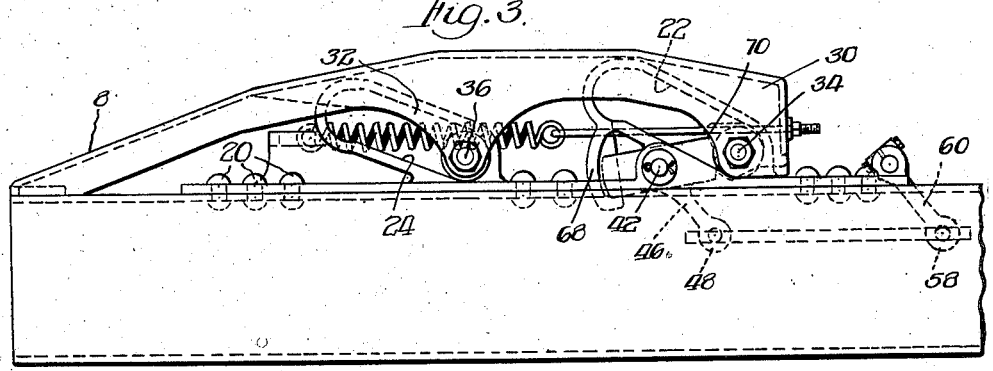
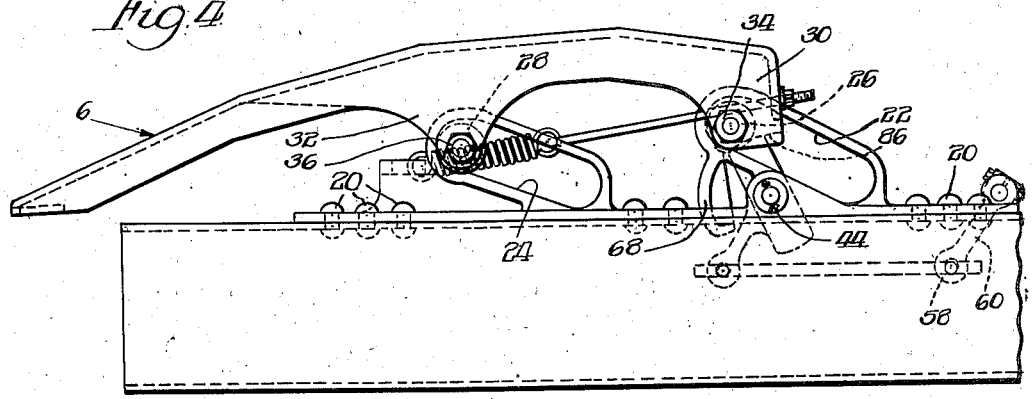
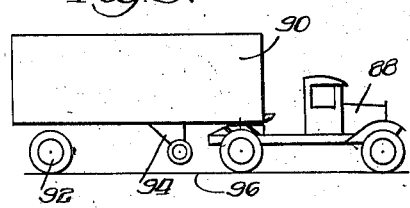
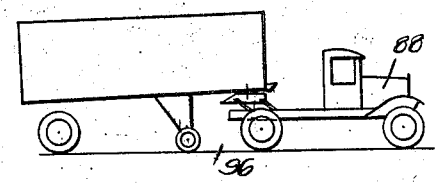
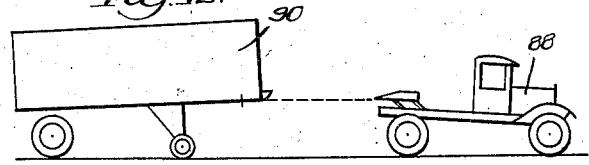
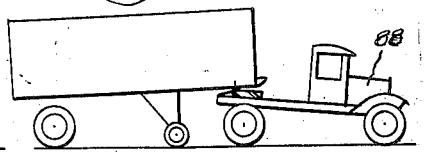
Inventor:
Edmund P. Kinne
By: Wilkinson, Huxley, Byron Knight
Attys.

Feb. 12, 1935.   E. P. KINNE   1,990,700
TRACTOR TRAILER DEVICE
Filed Oct. 10, 1932   3 Sheets-Sheet 3
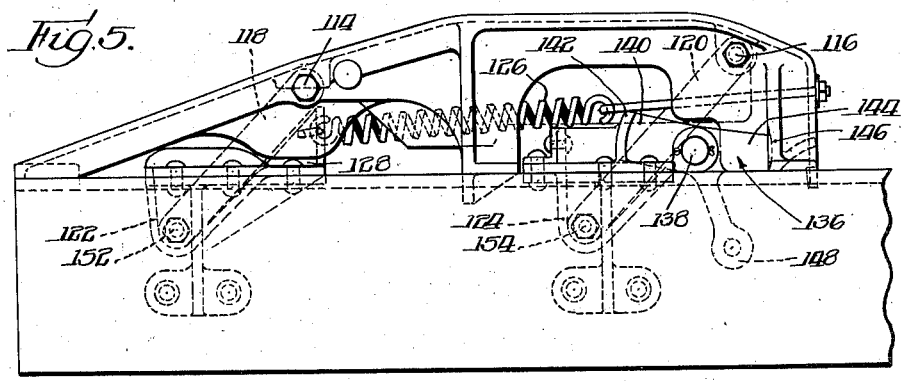
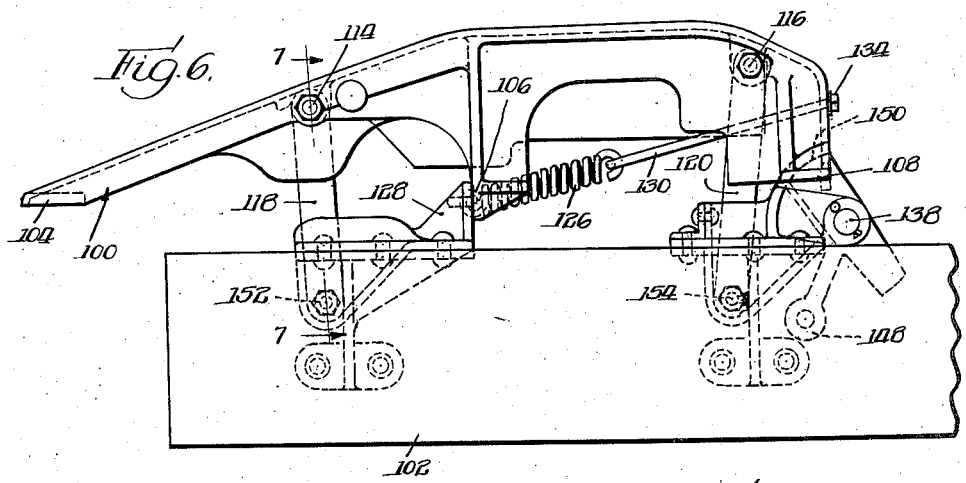
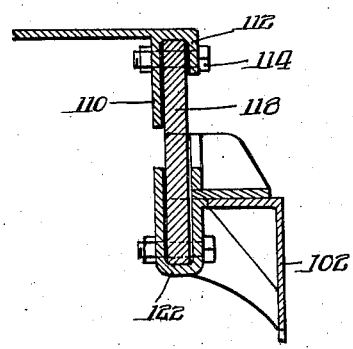
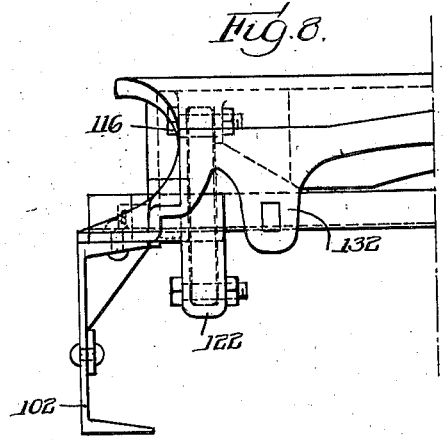
Inventor:
Edmund P. Kinne,
By Wilkinson Huxley Byron & Knight
attys.

Patented Feb. 12, 1935

1,990,700

UNITED STATES PATENT OFFICE 1,990,700

TRACTOR TRAILER DEVICE

Edmund P. Kinne, Alliance, Ohio, assignor to American Steel Foundries, Chicago, Ill., a corporation of New Jersey Application October 10, 1932, Serial No. 637,083

25 Claims. (Cl. 280—33.1)

The present invention relates to tractor-trailer devices, and more in particular to a novel fifth wheel for a drawn vehicle.

Among the objects of the present invention is to provide a fifth wheel for supporting a drawn vehicle such as a semi-trailer in a tractor-trailer device.

Another object of the present invention is to provide a novel fifth wheel for a drawn vehicle which is adapted to be movable under certain conditions for raising or elevating an end of a drawn vehicle, such as a semi-trailer in a tractor-trailer device.

The present invention comprehends the idea of providing a fifth wheel for a drawn vehicle which is adapted to be moved into spaced relation vertically with a driven vehicle to raise or elevate an end of the drawn vehicle normally supported thereby.

Still another object of the present invention is to provide a movable fifth wheel adapted to be associated with a driven vehicle for support of a vehicle drawn by this driven vehicle, this fifth wheel being adapted to be moved into a position in spaced relation vertically with the driven vehicle so as to raise or elevate that portion of the drawn vehicle supported thereby.

Still a further object of the present invention is to provide novel means in association with this movable fifth wheel for locking the same in either its normal operative position or in spaced relation vertically with the drawn vehicle.

The present invention further contemplates the idea of providing a movable fifth wheel in association with a driven vehicle for support of a drawn vehicle, which is movable angularly relative to this drawn vehicle, whereby the same is positioned in spaced relation vertically with the driven vehicle, means being further provided for normally urging this fifth wheel into its raised or elevated position.

A further object of the present invention is to provide novel means associated with the supported end of a drawn vehicle whereby the end may be disposed in an elevated or raised position to compensate for the expansion of the springs of the driven vehicle when the load from the supported end is removed therefrom. The end of the drawn vehicle is thus temporarily supported in this elevated or raised position whereby subsequent coupling of the vehicles is effected without the necessity of compressing the tractor springs due to raising and picking up of the trailer load as practiced at the present time. More particularly, the present invention contemplates the idea of providing novel means for raising and maintaining a supported end of a drawn semi-trailer in raised or elevated position relative to its normal running position with a driven vehicle, until the temporary trailer end supports have been lowered into contact with the roadway to support the trailer end in the elevated position after the drawn vehicle has been uncoupled therefrom. More particularly, the transfer of load from the fifth wheel of the driven vehicle to the temporary trailer support is accomplished by first placing the temporary trailer support in contact with the roadway, then unlocking the fifth wheel from its elevated position and moving the driven vehicle toward the drawn vehicle to permit the springs of the driven vehicle to expand while the fifth wheel remains in an elevated position in respect to the roadway but approaches its normal running position in relation to the driven vehicle frame. The trailer load is thus transferred to the temporary trailer support. Under these conditions, when the coupler mechanism is released, the driven vehicle may be easily parted from the drawn vehicle.

Inasmuch as the driven vehicle springs have been allowed to expand before uncoupling and the trailer load transferred from the temporary trailer support, the separation of the two vehicles is readily and easily accomplished inasmuch as the excessive friction between the fifth wheel and the vehicle supported thereby which occurs in the present practice where the trailer load is supported by the tractor during actual parting of the vehicles is eliminated. By eliminating the excessive friction which tends to drag the trailer end with the tractor when the vehicles are parted permits uncoupling between the two vehicles in accordance with the present invention when these vehicles are disposed at angles even up to 90°.

In attempting to uncouple at such angles with present devices, the trailer end which is supported entirely by the tractor fifth wheel and not by the trailer temporary supports, the trailer end is dragged sidewise even after the coupling device has been unlocked, this lateral or sidewise movement of the trailer preventing the uncoupling of the vehicles disposed at angles.

Another object within the purview of the present invention is to provide a movable fifth wheel in association with a driven vehicle adapted to be normally urged into a position in spaced relation vertically with this driven vehicle and provided with means conveniently operated by the operator of the driven vehicle for locking this fifth wheel in its various supporting positions.

The present invention also contemplates the idea of providing a novel method of coupling a driven and drawn vehicle, as well as a novel method of uncoupling these vehicles, the drawn vehicle in the present invention being disclosed as a semi-trailer.

In effecting a coupling of the driven and drawn vehicles in accordance with the herein described invention, the driven vehicle may pass freely under the drawn vehicle at angles up to 90° therewith without frictional resistance tending to force the trailer out of its temporarily supported position. This is accomplished because of the fact that following a previous uncoupling the trailer would have been left in an elevated position resting upon its temporary support. The driven vehicle thus can pass under the drawn vehicle without the springs of the driven vehicle being compressed or the end of the trailer elevated. After coupling has been accomplished, the load is transferred to the driven vehicle by raising the temporary trailer support and allowing the trailer end to ride solely upon the fifth wheel of the driven vehicle. This transfer of the load forces the fifth wheel into its lowest position with respect to the driven vehicle frame, and compresses the springs on this vehicle until this compressive force equals the load from the drawn vehicle.

In an illustrative embodiment selected to disclose the present invention, an uncoupling of a drawn vehicle, such as a trailer of the semi-trailing type, is shown as being effected by elevating or raising the end thereof which is supported by the driven vehicle and then temporarily supporting this end while the same is being unloaded, the driven vehicle being free at this time to be used with other trailers. More particularly, the raising or elevating of this supported end is effected by a movement of the driven vehicle, and while the semi-trailer or drawn vehicle is coupled to the driven vehicle. This elevating of the supported end of the semi-trailer is accomplished by holding the drawn vehicle stationary and moving the driven vehicle forwardly when the fifth wheel thereof is released, whereby the same is raised to elevate the semi-trailer.

In effecting a coupling of the driven and drawn vehicles in accordance with the present invention, the load from the drawn vehicle is transferred from the temporary supporting means therefor to the driven vehicle. More particularly, this transfer of the load from the temporarily supported end of a drawn vehicle is effected by moving the driven vehicle into a position whereby a fifth wheel therefor engages with the temporarily supported end of the drawn vehicle and thereby transferring the load from the temporary support to the fifth wheel of the driven vehicle. More specifically, the driven vehicle is first coupled to the drawn vehicle after which the temporary supporting means for the drawn vehicle is raised and then the temporarily supported end of the drawn vehicle settles down on the fifth wheel, forcing the fifth wheel into its lower position.

Other objects, features, capabilities, advantages and method steps are comprehended by the invention, as will later appear and as are inherently possessed thereby.

Figure 3 is a fragmentary view in side elevation of the embodiment shown in Figure 1 of the drawings;

Figure 4 is a fragmentary view in side elevation similar to Figure 3 of the drawings and disclosing the fifth wheel in its raised or elevated position;

Figure 5 is a fragmentary view in side elevation similar to Figure 3 of the drawings, disclosing an alternative embodiment made in accordance with the present invention;

Figure 6 is a fragmentary view in side elevation similar to Figure 5 of the drawings and disclosing the fifth wheel in raised or elevated position;

Figure 7 is a fragmentary view in cross section taken in the plane represented by line 7—7 of Figure 6 of the drawings;

Figure 8 is a fragmentary view in end elevation looking from right to left in Figure 5 of the drawings;

Figures 9 and 10 are diagrammatic views disclosing a method of uncoupling a driven and drawn vehicle in accordance with the present invention; and Figures 11 and 12 are diagrammatic views disclosing a method of coupling a driven and drawn vehicle in accordance with the present invention.

Figure 1:
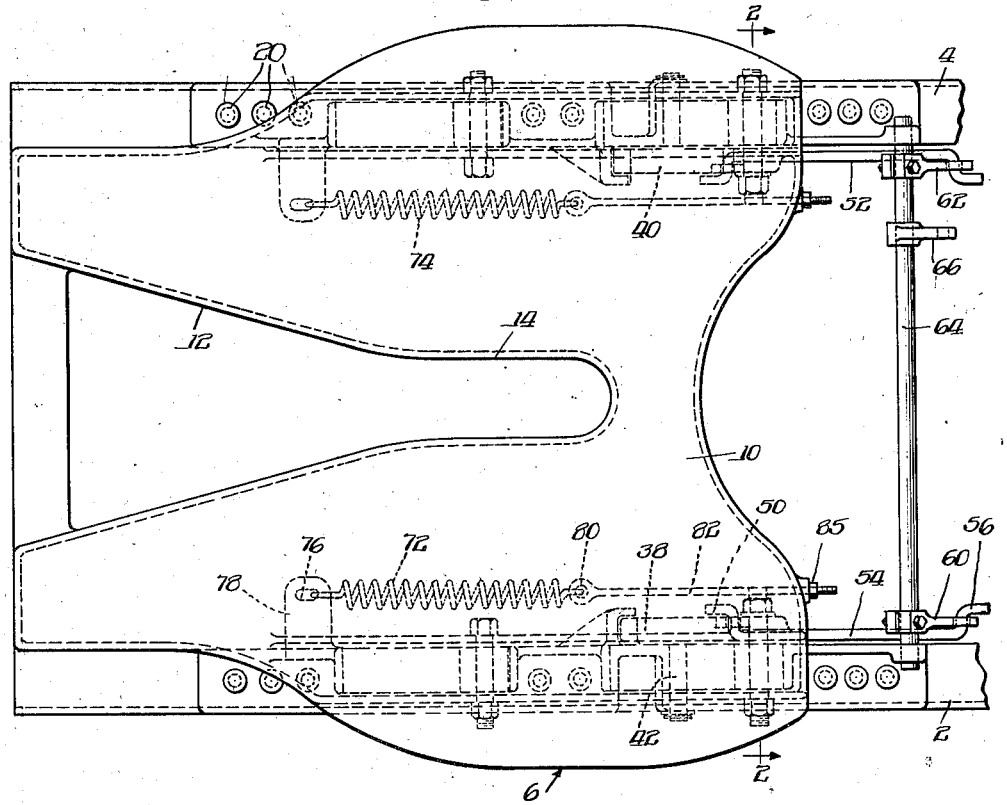
Figure 1 is a fragmentary top plan view of a vehicle incorporating a movable support or fifth wheel made in accordance with the present invention.
Figure 2:
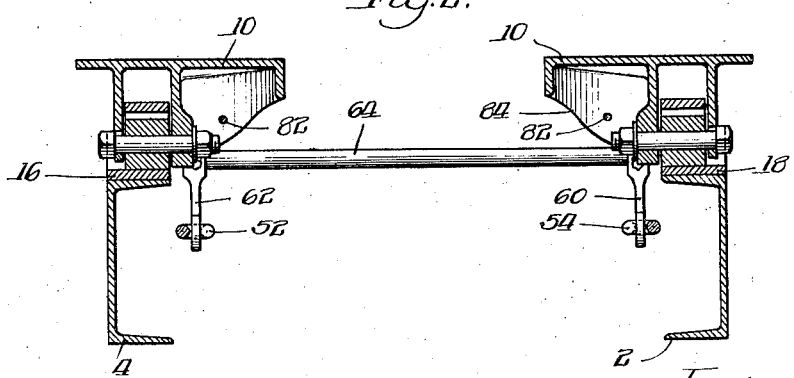
Figure 2 is a view in cross section taken in a plane represented by line 2—2 of Figure 1 of the drawings.

Referring now more in detail to the drawings, an embodiment of the present invention is shown in association with a vehicle such as a tractor or other power driven vehicle which may be conveniently used for drawing a second vehicle, such as a semi-trailer. The driven vehicle in the present disclosure is shown as being provided with side frame members 2 and 4 of channel shape, upon the top of which is supported a fifth wheel, generally designated as 6, this fifth wheel being formed with a top plate portion 10 having inclined surfaces or ramp, such as 8, for guiding a plate or supporting member associated with the forward end of the drawn vehicle, whereby the same may be guided thereover and into a position to effect a coupling between the driven and drawn vehicle. In the present disclosure, the top plate portion 10 is formed with a flanged slot 12 tapering from the rear portion forwardly and merging with a flanged portion 14 having the sides thereof substantially parallel, this portion being provided for receiving a downwardly projecting king pin or depending post secured to the under side of the drawn vehicle, a suitable coupling device, such as that disclosed in a copending application, Serial No. 611,261, filed May 14, 1932, being provided beneath the portion 14 for securing this king pin, as well as the drawn vehicle, to the driven vehicle, whereby the same may be drawn and have relative movement with the driven vehicle.

Mounted upon the top flange of each of the channel shaped members 2 and 4 are the fifth wheel supporting members 16 and 18, which are of like construction and which may be conveniently secured to the flanges of these frame members 2 and 4, as by means of rivets 20 or the like. Each of the members 16 and 18 is formed with a pair of angularly disposed guide slots 22 and 24 adapted to receive rollers 26 and 28, respectively, which may be secured between downwardly depending flanged portions 30 and 32 of the fifth wheel 6, as by means of the bolts 34 and 36, respectively. The fifth wheel 6 is normally in its lowered position as shown in Figure 3 of the drawings, when the drawn vehicle is coupled to the driven vehicle and is supported thereby, this movable fifth wheel 6 being maintained in this position as by means of locking members 38 and 40. Each of these locking members is formed with a projecting portion or shaft 42 supported for rotation within suitable bearings provided in the supporting members 16 and 18 and held in place as by means of the cotter pins 44. Each of these locking members 38 and 40 is provided with a depending arm 46 provided with an eye 48 adapted to receive the knuckled end 50 of the links 52 and 54 which extend forwardly and have their forward knuckled ends 56 engaged by the eyes 58 of operating levers 60 and 62 suitably secured in spaced relation upon a transverse operating shaft 64 which may be suitably journaled in bearings provided on the supporting members 16 and 18. Between the operating levers 60 and 62 is another lever 66 suitably secured to the shaft 64 and which may be connected to suitable operating mechanism extending to the forward portion of the driven vehicle, as for example, adjacent the operator of this driven vehicle, whereby the locking members 38 and 40 may be conveniently moved for controlling the movement of the fifth wheel 6.

When the fifth wheel 6 is in its lower position, as shown in Figure 3 of the drawings, and in association with the frame members 2 and 4, the same is maintained in this position by means of the locking members 38 and 40, each of which is adapted to engage a flange 68 formed adjacent the rearward portion of guide slots 22 of each of the supporting members 16 and 18, and an oppositely disposed flange 70 provided on the fifth wheel 6 and adjacent each of these locking members. These locking members 38 and 40 thereby prevent rearward movement of the fifth wheel 6 and hold the same in association with the frame members 2 and 4. The fifth wheel 6 is normally urged in a rearward direction as by means of the coil springs 72 and 74, each of which has its rear end engaging in the slot 76 of brackets 78 projecting inwardly from the supporting members 16 and 18, the forward portion of these coil springs 72 and 74 engaging in the eyes 80 of rods 82, which normally extend through apertures provided in the flange 84 depending from the forward edge of the fifth wheel 6, these rods being held in position, as by means of the nuts 85, threadedly engaging the ends thereof.

Upon rearward movement of the links 52 and 54, the locking members 38 and 40 are rotated about the spindle or shaft portion 42 thereof, into a position, as clearly shown in Figure 4 of the drawings, to release the fifth wheel 6. At this time, and under the impulse of the coil springs 72 and 74, the fifth wheel 6 is moved in a rearward direction, whereby the rollers 26 and 28 thereof move along the inclined guide slots 22 and 24, respectively, to lift or raise this fifth wheel 6 into the position as shown in Figure 4 of the drawings. The fifth wheel 6 is provided with flanged portions 86 which, when the fifth wheel 6 is in the position as shown in Figure 4, are adapted to engage with the locking members 38 and 40 whereby the same is locked in its uppermost or elevated position and the same maintained in this position as by means of these locking members. Upon release of the locking members 38 and 40, when a load is applied to the fifth wheel 6, the same will return to its lowermost position as shown in Figure 3 and will be engaged by the locking members 38 and 40 which maintain the same in this position against the action of the coil springs 72 and 74.

In Figures 5 to 8 inclusive of the drawings is disclosed another embodiment for effecting the new and different results in accordance with the present disclosure. In this embodiment, the fifth wheel 100 is in all essentials substantially the same as the fifth wheel 6 heretofore disclosed and described, this fifth wheel 100 being movably supported adjacent the rear end of a driven vehicle, as for example, a tractor or the like, and spanning between girders or channel members 102 forming the frame of this tractor, suitable spaced bearing members 104, 106 and 108 being provided on each side of this fifth wheel for supporting engagement with these frame members 102 when the same is in the position as shown in Figure 5 of the drawings.

As in the hereinbefore described embodiment, this fifth wheel is adapted to be moved from the position as shown in Figure 5 to its raised or elevated position, as shown in Figure 6 of the drawings. In this embodiment, however, the fifth wheel 100 on each side and in spaced relation is provided with depending flanges 110 and 112 adapted to receive the bolts or other pivotal means 114 and 116 whereby the same is movably connected to the upper end of levers 118 and 120, respectively. These levers 118 and 120 have their lower ends received in a suitable recess of bracket or supporting members 122 and 124 secured in any desired manner to the spaced frame members 102. This movable fifth wheel is normally urged from its lowermost position as shown in Figure 5 of the drawings under the impulse of coil springs 126, having their rearward ends secured to brackets 128 associated with the bracket members 122, and their other ends connected to rods 130 secured to depending flanges 132 at the front of the fifth wheel 100 as by means of nuts 134, it of course being understood that these coil springs are provided adjacent each of the spaced frame members 102 in accordance with the disclosure in Figure 1 of the drawings.

The fifth wheel 100 is locked in its lowermost position, as shown in Figure 5 of the drawings, by means of latch or locking members 136 corresponding substantially to the locking members 38 and 40 of the hereinbefore referred to embodiment, the same being provided with a stub shaft 138 suitably journaled in bracket members mounted on the frame members 102 and having one end 140 engageable with flanges 142 of bracket members associated with the bracket members 124 and secured to these frame members 102, the other end 144 thereof engaging with depending flanges 146 of the fifth wheel, thereby preventing rearward movement of this fifth wheel into its raised position. Each of these locking members 136 is formed with a depending arm 148 which may be moved in any desired manner, as for example, by means of the mechanism disclosed in Figures 1 to 4 inclusive of the drawings.

Upon rotation of the locking members 136 from the position as shown in Figure 5 to that as shown in Figure 6 of the drawings, the fifth wheel 100 is moved under the impulse of coil springs 126 into its raised or elevated position, the ends 140 of these locking members 136 being engageable with flanges 150 of the movable fifth wheel and serving to hold the same in this raised position.

It will of course be quite apparent that movement of the fifth wheel is about the bolts 152 and 154 which serve to secure the levers 118 and 120, respectively, in association with the supporting brackets 122 and 124. The rearward movement of the fifth wheel is limited by engagement of the levers 118 with the rear wall defining the recess of each of the brackets 122. When the levers 118 are in the position as shown in Figure 6 of the drawings, the same lean rearwardly in relation to the perpendicular or vertical plane through the axis of rotation, while the levers 120 are disposed to lean forwardly of a perpendicular or vertical plane through the axis of rotation thereof, thereby resulting in considerable stability when this movable fifth wheel is in this elevated position.

Either of the movable fifth wheels made in accordance with the above disclosure is particularly adapted for use in conjunction with the novel method of uncoupling a driven and drawn vehicle as diagrammatically disclosed in Figures 9 and 10 of the drawings, as well as for coupling a driven and drawn vehicle as clearly shown in Figures 11 and 12 of the drawings. It is of course to be understood that either of the embodiments, or others involving the principle disclosed, may be used with equal advantage but for the purpose of further discussion as to the operation of the device, reference will be had to the embodiment shown in Figures 1 to 4 inclusive. In Figures 9 to 12 inclusive, the movable fifth wheel 6 is disclosed as being connected to the rear end portion of a power driven tractor or truck 88 for drawing a semi-trailer 90. The semi-trailer 90 has its rear end portion supported upon a truck provided with the wheels 92, while the front portion thereof is provided with a depending king pin adapted to be received by a coupling mechanism associated with the fifth wheel 6 and maintained in fixed relative position therewith. Intermediate the ends of the semi-trailer 90 is disclosed temporary supporting means, generally designated as 94, which may be withdrawn from supporting contact or engagement with the surface 96 over which the tractor 88 and semi-trailer 90 are moved, or the same may be extended into contacting relation therewith, as will be later more fully disclosed.

Under ordinary parking conditions where the amount of space is not too limited, the semi-trailer may be parked in the usual way by backing it into position, setting the brakes, lowering the temporary support 94, releasing the coupler which is associated with the fifth wheel and which retains the king pin of the semi-trailer, and driving away the tractor. For these operations it is unnecessary to make use of the elevating feature of this fifth wheel, although it would be desirable to do so if the semi-trailer is parked on such a surface that the temporary support 94 would be depressed when the semi-trailer is loaded, as for example, if the wheels were resting on relatively soft ground.

On the other hand if the parking space is very limited, it will be desirable to make use of the elevating feature of the fifth wheel in order that the driven vehicle or tractor and semi-trailer may be coupled or uncoupled at any angle up to ninety degrees. The method of operation is then as follows:

At a convenient location near the parking space the brakes are set on the semi-trailer, the locking members 38 and 40 are released permitting the fifth wheel to shift to its elevated position, as shown in Figure 4, as the tractor is moved slightly forward. With the fifth wheel in the elevated position the locking members 38 and 40 are set to secure it in that position. Releasing the brakes, the semi-trailer may now be maneuvered to its parking position, the brakes again set, and the temporary support 94 lowered to the surface 96. The locking members 38 and 40 may then be again released and the tractor 88 backed up slightly to permit the springs of the tractor 88 to expand while the fifth wheel remains in an elevated position with respect to the roadway 96 but approaches its normal running position in relation to the driven vehicle frame. The trailer load is thus transferred from the springs of the tractor 88 to the temporary support 94.

The coupling mechanism may then be unlocked, releasing the king pin of the semi-trailer and permitting the tractor 88 to be parted from the semi-trailer 90. Since the springs of the tractor 88 have been allowed to expand before uncoupling and since the trailer load has been transferred to the temporary trailer support 94, the separation of the two vehicles is accomplished without excessive friction between the respective fifth wheels which occurs under present practice where the trailer load is supported by the tractor during the actual parting operation. The elimination of this excessive friction which tends to drag the trailer end with the tractor when the vehicles are parting, permits accurate parking in limited space and makes possible uncoupling of the two vehicles when they are at angles up to ninety degrees. This ability to couple or uncouple at such angles is also very desirable when vehicles are parked for loading or unloading from the side instead of, as is more common, the rear.

When the tractor and semi-trailer are coupled or uncoupled in accordance with the herein described invention, the fifth wheel on the tractor may pass freely under the semi-trailer without such frictional resistance as will tend to force the trailer out of its temporarily supported position. This is accomplished by parking the semi-trailer in an elevated position as above described so that the friction between the two vehicles, as coupling is later effected under the conditions shown in Figure 12, is limited to that which results from whatever tension is developed in the springs 72 and 74 as the fifth wheel may be forced slightly downward along the guide slots 22 and 24 when the fifth wheel of the tractor moves under the semi-trailer until the king pin thereof is engaged by the coupling mechanism associated with the fifth wheel on the tractor. Since the ramp or fifth wheel 6 is held in its raised position by the springs 72 and 74 as shown in Figure 12, it will be maintained in contact with the under side of the semi-trailer at all times while coupling is being effected so that the coupler associated with the fifth wheel will be in proper position for engagement with the king pin on the semi-trailer regardless of the fact that the height of the trailer may be varied during loading or unloading operations. After coupling has been accomplished conditions will be as shown in Figure 11, and the load may be transferred to the tractor by raising the temporary trailer support and allowing the trailer end to ride solely upon the fifth wheel of the tractor. This transfer of the load forces the fifth wheel into its lowest position in respect to the tractor frame and compresses the springs on the tractor until this compressive force equals the load from the semi-trailer. The fifth wheel may then be locked in its lowermost position, as shown in Figure 3, and the condition of the two vehicles will be as shown in Figure 9.

It will be quite apparent from the above disclosure that the providing of a fifth wheel 6 of the type now disclosed, provides a structure whereby the tractor or driven vehicle may freely pass from or in under a temporarily supported elevated end of a trailer, thereby permitting full coupling or uncoupling when the driven and drawn vehicles are in alignment or angularly disposed in relation to one another, thereby adapting a tractor-trailer device of the type herein disclosed for use within confined areas or within areas which permit of limited relative angular movement of the tractor and trailer.

In the previously described embodiments, the movable fifth wheel has been disclosed as being moved into its uppermost position by the tractor or driven vehicle when the same is driven forward or away from the drawn vehicle or semi-trailer. It is of course obvious that this could be accomplished in other ways by the use of separate power means, such as a mechanical take-off from the tractor motor, or by the use of hydraulic cylinders, as well as other power devices, and the present invention accordingly comprehends the use thereof without departing from the spirit of the invention.

While I have herein described and upon the drawings shown illustrative embodiments of the invention, it is to be understood that the invention is not limited thereto but may comprehend other constructions, arrangements of parts, details, features and method steps without departing from the spirit of the invention.

I claim:

1. In a vehicle unit, the combination of a driven vehicle, a drawn vehicle coupled thereto, a fifth wheel member for said drawn vehicle, means for moving said fifth wheel member to elevate said drawn vehicle upon relative movement between said vehicles, and single means comprising pivotally mounted locking members for locking said fifth wheel member in a plurality of supporting positions.

2. In a vehicle unit, the combination of a driven vehicle, a drawn vehicle coupled thereto, a fifth wheel member supported on said driven vehicle, means for moving said fifth wheel member to elevate said drawn vehicle upon relative movement between said vehicles, and resilient means for urging said fifth wheel member into an elevated position.

3. In a vehicle unit, the combination of a driven vehicle, a drawn vehicle coupled thereto, a fifth wheel member for said drawn vehicle, and inclined guide members for moving said fifth wheel member to elevate said drawn vehicle upon relative movement between said vehicles, and single means comprising pivotally mounted locking members for locking said fifth wheel member in a plurality of supporting positions.

4. In a vehicle unit, the combination of a driven vehicle, a drawn vehicle coupled thereto, a fifth wheel member for said drawn vehicle, inclined guide members for moving said fifth wheel member to elevate said drawn vehicle upon relative movement between said vehicles, and resilient means for urging said fifth wheel member along said inclined guide members.

5. In a vehicle unit, the combination of a driven vehicle, a drawn vehicle coupled thereto, a fifth wheel member for said drawn vehicle, inclined guide members for moving said fifth wheel member to elevate said drawn vehicle upon relative movement between said vehicles, means comprising pivotally mounted locking members for locking said fifth wheel member in a plurality of supporting positions, and resilient means for urging said fifth wheel along said inclined guide members.

6. In a vehicle, the combination of a frame, a fifth wheel member normally in association with said frame and movable into spaced relation vertically therewith, means for locking said fifth wheel member in its associated position with said frame, and resilient means for urging said fifth wheel member into said spaced position upon release of said locking means.

7. In a vehicle, the combination of a frame, a fifth wheel member normally in association with said frame and movable into spaced relation vertically therewith, means for locking said fifth wheel member in its associated position with said frame, means for urging said fifth wheel member into said spaced position upon release of said locking means, and means for locking said fifth wheel member when in position in spaced relation with said frame, said locking means being movable relative to said frame and engageable with said fifth wheel member in said position.

8. In a vehicle, the combination of a frame, a fifth wheel member in association with said frame and movable into spaced relation vertically therewith, angularly disposed guide means for moving said fifth wheel member into said spaced relation, and resilient means for urging said fifth wheel member along said guide means.

9. In a vehicle, the combination of a frame, a fifth wheel member in association with said frame and movable into spaced relation vertically therewith, angularly disposed guide means for moving said fifth wheel member into said spaced relation, means comprising movable locking members for locking said fifth wheel member in association with said frame, and resilient means for urging said fifth wheel member along said guide means.

10. In a vehicle, the combination of a frame, a fifth wheel member in association with said frame and movable into spaced relation vertically therewith, and means comprising movable locking members for locking said fifth wheel member in associated relation with said frame, said locking members being adapted to maintain said fifth wheel member in its spaced relation with said frame.

11. In a vehicle, the combination of a frame, a fifth wheel member in association with said frame and movable into spaced relation vertically therewith, means for locking said fifth wheel member in associated relation with said frame, and means for urging said fifth wheel member into said spaced relation when said locking means is released, said locking means being adapted to maintain said fifth wheel member in its spaced relation with said frame.

12. In a vehicle unit, the combination of a driven vehicle, a drawn vehicle coupled thereto, a movable fifth wheel member supporting said drawn vehicle, levers for supporting said fifth wheel member on said driven vehicle whereby the same may be swung into a raised or elevated position in respect thereto, means for locking said fifth wheel member in its lower and raised positions, and means for urging said fifth wheel member into said elevated position when said locking means is operated to release the same.

13. In a vehicle unit, the combination of a driven vehicle, a drawn vehicle coupled thereto, a movable fifth wheel member for supporting said drawn vehicle, levers connected at one end to said driven vehicle and at the other end to said fifth wheel member for supporting said fifth wheel member on said driven vehicle whereby the same may be moved into a raised or elevated position in respect thereto, said levers being disposed in non-parallel relation.

14. In a vehicle unit, the combination of a driven vehicle, a drawn vehicle coupled thereto, a movable fifth wheel member for supporting said drawn vehicle, levers connected at one end to said driven vehicle and at the other end to said fifth wheel member for supporting said fifth wheel member on said driven vehicle whereby the same may be moved into a raised or elevated position in respect thereto, and oppositely disposed stops engaging with each of said levers for limiting movement of said fifth wheel member.

15. In combination, a driven vehicle, a drawn vehicle of the semi-trailer type, a fifth wheel member mounted on said driven vehicle and movable into spaced relation vertically therewith, the front end of said semi-trailer being supported on said fifth wheel member, angularly disposed guide means for supporting and guiding said fifth wheel member during said movement, means for locking said fifth wheel member to said driven vehicle, resilient means for urging said fifth wheel member along said guide means, and a temporary support means on the drawn vehicle.

16. In a vehicle, the combination of a frame, a fifth wheel member in association with said frame and movable into spaced relation vertically therewith, and means pivotally mounted on said frame and engageable on said fifth wheel member when in one position for locking said fifth wheel member in associated relation with said frame, said means when in another position being adapted to maintain said fifth wheel member in its spaced relation with said frame.

17. In a vehicle, the combination of a frame, spaced pairs of inclined supporting guides thereon, a fifth wheel member in association with said frame and being supported by said guides, resilient means for urging said fifth wheel member into elevated position along said guides, and single means for locking said fifth wheel member in either its normal or elevated position.

18. In a vehicle, the combination of a frame, spaced pairs of inclined supporting guides thereon, a fifth wheel member in association with said frame and being supported by said guides, means for urging said fifth wheel member into elevated position along said guides, and means for locking said fifth wheel member in associated relation with said frame, said means being adapted to maintain said fifth wheel member in its elevated position.

19. In a vehicle, the combination of a frame, a fifth wheel member in association with said frame, means for movably supporting said fifth wheel member on said frame whereby the same may be moved into spaced relation vertically therewith, said means comprising spaced pairs of levers pivotally connected at one end to said frame and at the other end to said fifth wheel member, said pairs of levers being in non-parallel relation for increased stability, and means engaging one of said pairs of levers for limiting movement of said fifth wheel member when in its elevated position.

20. In a vehicle, the combination of a frame, a fifth wheel member in association with said frame, means for movably supporting said fifth wheel member on said frame whereby the same may be moved into spaced relation vertically therewith, said means comprising spaced pairs of levers pivotally connected at one end to said frame and at the other end to said fifth wheel member, said pairs of levers being in non-parallel relation for increased stability, means engaging one of said pairs of levers for limiting movement of said fifth wheel member when in its elevated position, and means for urging said fifth wheel member into said elevated position.

21. In a vehicle, the combination of a frame, a fifth wheel member in association with said frame, means for movably supporting said fifth wheel member on said frame whereby the same may be moved into spaced relation vertically therewith, said means comprising spaced pairs of levers pivotally connected at one end to said frame and at the other end to said fifth wheel member, said pairs of levers being in non-parallel relation for increased stability, means engaging one of said pairs of levers for limiting movement of said fifth wheel member when in its elevated position, means for locking said fifth wheel member in association with said frame, and means for urging said fifth wheel member into said elevated position when released by said locking means.

22. In a vehicle, the combination of a frame, a fifth wheel member in association with said frame, means for movably supporting said fifth wheel member on said frame whereby the same may be moved into spaced relation vertically therewith, said means comprising spaced pairs of levers pivotally connected at one end to said frame and at the other end to said fifth wheel member, said pairs of levers being in non-parallel relation for increased stability, means engaging one of said pairs of levers for limiting movement of said fifth wheel member when in its elevated position, means for locking said fifth wheel member in association with said frame, and means for urging said fifth wheel member into said elevated position when released by said locking means, said means being adapted to maintain said fifth wheel member in its elevated position.

23. In a vehicle, the combination of a frame, a fifth wheel member in association with said frame, and means for movably supporting said fifth wheel member on said frame, said means comprising members secured to said frame and having inclined closed slots, rollers secured to said fifth wheel member and disposed within said slots, means for locking said fifth wheel member in association with said frame, and resilient means between said fifth wheel member and frame for moving said fifth wheel member into an elevated position relative to said frame along said slots.

24. In a vehicle, the combination of a frame, a fifth wheel member in association with said frame, and means for movably supporting said fifth wheel member on said frame, said means comprising members secured to said frame and having inclined closed slots, rollers secured to said fifth wheel member and disposed within said slots, means for locking said fifth wheel member in association with said frame, resilient means between said fifth wheel member and frame for moving said fifth wheel member into an elevated position relative to said frame along said slots, and means for locking said fifth wheel member in said elevated position.

25. In a vehicle, the combination of a frame, a fifth wheel member in association with said frame, and means for movably supporting said fifth wheel member on said frame, said means comprising members secured to said frame and having inclined closed slots, rollers secured to said fifth wheel member and disposed within said slots, resilient means between said fifth wheel member and frame for moving said fifth wheel member into an elevated position relative to said frame along said slots, and a pivotally mounted latch member engageable at one end with said fifth wheel member for locking the same in its lower position and engageable at its other end with said fifth wheel member for locking the same in its elevated position.

EDMUND P. KINNE.